US010362026B2

(12) United States Patent
Johansson et al.

(10) Patent No.: US 10,362,026 B2
(45) Date of Patent: Jul. 23, 2019

(54) PROVIDING MULTI-FACTOR AUTHENTICATION CREDENTIALS VIA DEVICE NOTIFICATIONS

(71) Applicant: Amazon Technologies, Inc., Seattle, WA (US)

(72) Inventors: Jesper Mikael Johansson, Redmond, WA (US); Darren Ernest Canavor, Redmond, WA (US); Daniel Wade Hitchcock, Bothell, WA (US); Bharath Kumar Bhimanaik, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/809,757

(22) Filed: Jul. 27, 2015

(65) Prior Publication Data

US 2016/0337344 A1    Nov. 17, 2016

Related U.S. Application Data

(63) Continuation-in-part of application No. 14/572,739, filed on Dec. 16, 2014, now Pat. No. 9,473,491, and a continuation-in-part of application No. 14/107,150, filed on Dec. 16, 2013.

(51) Int. Cl.
*H04L 29/06* (2006.01)

(52) U.S. Cl.
CPC ...... *H04L 63/0838* (2013.01); *H04L 63/0281* (2013.01); *H04L 63/08* (2013.01); *H04L 2463/082* (2013.01)

(58) Field of Classification Search
CPC .................................................. H04L 63/0838

USPC ............................................................ 726/5
See application file for complete search history.

(56) References Cited

U.S. PATENT DOCUMENTS

| 5,835,722 | A | 11/1998 | Bradshaw et al. |
| 5,880,523 | A | 3/1999 | Candelore |
| 6,233,339 | B1 | 5/2001 | Kawano et al. |
| 7,103,850 | B1* | 9/2006 | Engstrom ............... G06F 9/451 715/778 |
| 7,342,594 | B1* | 3/2008 | Ort ........................ G06F 9/4443 345/629 |

(Continued)

FOREIGN PATENT DOCUMENTS

| WO | 2012173681 A1 | 12/2012 |
| WO | 2013081508 A2 | 6/2013 |

OTHER PUBLICATIONS

U.S. Appl. No. 14/809,762 entitled "Approaches for Providing Multi-Factor Authentication Credentials", filed Jul. 27, 2015.

(Continued)

*Primary Examiner* — Peter C Shaw
(74) *Attorney, Agent, or Firm* — Thomas | Horstemeyer, LLP

(57) ABSTRACT

Disclosed are various embodiments for providing multi-factor authentication credentials. In one embodiment, in response to a request from an application, a notification is generated in a notification area of a display. Entry of a user approval is facilitated via the notification. In response to receiving the approval, a security credential is transferred to the application. In another embodiment, the security credential may be shown in the notification area so that a user may enter it in a form field of the application.

20 Claims, 10 Drawing Sheets

(56) References Cited

U.S. PATENT DOCUMENTS

| | | | |
|---|---|---|---|
| 8,745,705 B2 | 6/2014 | Hitchcock et al. | |
| 8,769,643 B1* | 7/2014 | Ben Ayed | H04W 12/06 |
| | | | 726/5 |
| 8,776,194 B2 | 7/2014 | Hitchcock et al. | |
| 8,819,795 B2 | 8/2014 | Hitchcock et al. | |
| 8,832,807 B1* | 9/2014 | Kuo | G06F 21/45 |
| | | | 713/183 |
| 8,850,010 B1 | 9/2014 | Qureshi | |
| 8,863,250 B2 | 10/2014 | Hitchcock et al. | |
| 8,955,065 B2 | 2/2015 | Hitchcock et al. | |
| 9,055,055 B1 | 6/2015 | Strand et al. | |
| 9,210,170 B1* | 12/2015 | Kim | H04L 63/10 |
| 9,237,305 B2 | 1/2016 | Guzman et al. | |
| 9,294,476 B1 | 3/2016 | Lurey et al. | |
| 2002/0073046 A1* | 6/2002 | David | G06F 21/33 |
| | | | 705/67 |
| 2002/0162019 A1* | 10/2002 | Berry | G06F 21/33 |
| | | | 726/5 |
| 2004/0172472 A1 | 9/2004 | Jackel et al. | |
| 2005/0177731 A1 | 8/2005 | Torres et al. | |
| 2006/0083228 A1 | 4/2006 | Ong et al. | |
| 2007/0113294 A1* | 5/2007 | Field | H04L 63/083 |
| | | | 726/27 |
| 2007/0186106 A1 | 8/2007 | Ting et al. | |
| 2007/0192733 A1* | 8/2007 | Horiuchi | G06F 3/0483 |
| | | | 715/788 |
| 2008/0028447 A1* | 1/2008 | O'Malley | G06F 21/31 |
| | | | 726/6 |
| 2008/0307236 A1 | 12/2008 | Lu et al. | |
| 2009/0146267 A1 | 6/2009 | Peytavy et al. | |
| 2009/0249247 A1 | 10/2009 | Tseng et al. | |
| 2009/0300097 A1 | 12/2009 | Meyer | |
| 2010/0107229 A1* | 4/2010 | Najafi | G06F 21/35 |
| | | | 726/6 |
| 2011/0061016 A1 | 3/2011 | Song et al. | |
| 2011/0107407 A1* | 5/2011 | Ganesan | G06F 21/33 |
| | | | 726/6 |
| 2011/0143711 A1* | 6/2011 | Hirson | G06Q 20/32 |
| | | | 455/410 |
| 2011/0219230 A1 | 9/2011 | Oberheide et al. | |
| 2011/0265172 A1 | 10/2011 | Sharma et al. | |
| 2011/0265173 A1 | 10/2011 | Naaman et al. | |
| 2012/0005074 A1* | 1/2012 | Kothandaraman | G06Q 20/10 |
| | | | 705/39 |
| 2012/0198228 A1 | 8/2012 | Oberheide et al. | |
| 2012/0198535 A1 | 8/2012 | Oberheide et al. | |
| 2013/0024925 A1 | 1/2013 | Venkataramani | |
| 2013/0055372 A1* | 2/2013 | Chao | G06F 21/31 |
| | | | 726/7 |
| 2013/0091544 A1 | 4/2013 | Oberheide et al. | |
| 2013/0198818 A1 | 8/2013 | Hitchcock et al. | |
| 2013/0198821 A1 | 8/2013 | Hitchcock et al. | |
| 2013/0198822 A1 | 8/2013 | Hitchcock et al. | |
| 2013/0198823 A1 | 8/2013 | Hitchcock et al. | |
| 2013/0198824 A1 | 8/2013 | Hitchcock et al. | |
| 2013/0212387 A1 | 8/2013 | Oberheide et al. | |
| 2013/0262857 A1 | 10/2013 | Neuman et al. | |
| 2013/0312078 A1 | 11/2013 | Oberheide et al. | |
| 2014/0040628 A1 | 2/2014 | Fort et al. | |
| 2014/0101734 A1 | 4/2014 | Ronda et al. | |
| 2014/0115341 A1* | 4/2014 | Robertson | H04L 9/3228 |
| | | | 713/183 |
| 2014/0120961 A1 | 5/2014 | Buck | |
| 2014/0157381 A1 | 6/2014 | Disraeli | |
| 2014/0189808 A1 | 7/2014 | Mahaffey et al. | |
| 2014/0223175 A1 | 8/2014 | Bhatnagar | |
| 2014/0245379 A1 | 8/2014 | Oberheide et al. | |
| 2014/0245389 A1 | 8/2014 | Oberheide et al. | |
| 2014/0245396 A1 | 8/2014 | Oberheide et al. | |
| 2014/0245450 A1 | 8/2014 | Oberheide et al. | |
| 2014/0250517 A1* | 9/2014 | Kim | H04L 9/3228 |
| | | | 726/7 |
| 2014/0259028 A1* | 9/2014 | Atwood | G06F 9/543 |
| | | | 719/313 |
| 2014/0259130 A1 | 9/2014 | Li et al. | |
| 2014/0331060 A1 | 11/2014 | Hayton | |
| 2014/0344907 A1 | 11/2014 | Wan et al. | |
| 2015/0039803 A1 | 2/2015 | Yamamoto | |
| 2015/0040190 A1 | 2/2015 | Oberheide et al. | |
| 2015/0046989 A1 | 2/2015 | Oberheide et al. | |
| 2015/0046990 A1 | 2/2015 | Oberheide et al. | |
| 2015/0067830 A1 | 3/2015 | Johansson et al. | |
| 2015/0074408 A1 | 3/2015 | Oberheide et al. | |
| 2015/0074644 A1 | 3/2015 | Oberheide et al. | |
| 2015/0134956 A1 | 5/2015 | Stachura et al. | |
| 2015/0312250 A1* | 10/2015 | Redberg | H04L 63/067 |
| | | | 726/6 |
| 2016/0197914 A1 | 7/2016 | Oberheide et al. | |
| 2016/0241548 A1* | 8/2016 | Kim | G06F 21/74 |

OTHER PUBLICATIONS

U.S. Appl. No. 14/107,150 entitled "Providing Account Information to Applications", filed Dec. 16, 2013.

U.S. Appl. No. 14/572,739 entitled "Computing Device With Integrated Authentication Token", filed Dec. 16, 2014.

U.S. Appl. No. 13/771,373, entitled "Information Manager,", filed Feb. 20, 2013.

U.S. Appl. No. 13/792,678, entitled "Proxy Server-Based Network Site Account Management,", filed Mar. 11, 2013.

U.S. Appl. No. 14/093,143, entitled "Updating Account Data for Multiple Account Providers,", filed Nov. 29, 2013.

U.S. Appl. No. 13/679,254, entitled "Mapping Stored Client Data to Requested Data Using Metadata,", filed Nov. 16, 2012.

Google Authenticator, From Wikipedia, the free encyclopedia, 7 pages, retrieved on Jun. 23, 2015, https://en.wikipedia.org/wiki/Google_Authenticator.

Guide to Two-Factor Authentication, Duo Security, 3 pages, retrieved on Jun. 23, 2015, https://guide.duosecurity.com/.

U.S. Appl. No. 62/100,203, filed Jan. 6, 2015 (21 pages).

U.S. Appl. No. 14/107,150, filed Dec. 16, 2013, Response to Final Office Action dated Aug. 11, 2016.

U.S. Appl. No. 14/107,150, filed Dec. 16, 2013, Final Office Action dated Aug. 11, 2016.

U.S. Appl. No. 14/107,150, filed Dec. 16, 2013, Response to Non-Final Office Action dated Feb. 2, 2016.

U.S. Appl. No. 14/107,150, filed Dec. 16, 2013, Non-Final Office Action dated Feb. 2, 2016.

U.S. Appl. No. 14/572,739, filed Dec. 16, 2014, Notice of Allowance dated Jun. 15, 2016.

U.S. Appl. No. 14/572,739, filed Dec. 16, 2014, Response to Non-Final Office Action dated Feb. 12, 2016.

U.S. Appl. No. 14/572,739, filed Dec. 16, 2014, Non-Final Office Action dated Feb. 12, 2016.

U.S. Appl. No. 14/809,762, filed Jul. 27, 2015, Response to Non-Final Office Action dated Oct. 24, 2016.

U.S. Appl. No. 14/809,762, filed Jul. 27, 2015, Non-Final Office Action dated Oct. 24, 2016.

International Search Report for PCT/US2016/043964 dated Oct. 25, 2016.

U.S. Appl. No. 15/293,534, filed Oct. 14, 2016, Notice of Allowance dated May 30, 2017.

U.S. Appl. No. 14/809,762, filed Jul. 27, 2015, Response to Final Office Action dated May 19, 2017.

U.S. Appl. No. 14/809,762, filed Jul. 27, 2015, Final Office Action dated May 19, 2017.

U.S. Appl. No. 14/107,150, filed Dec. 16, 2013, Response to Non-Final Office Action dated Apr. 27, 2017.

U.S. Appl. No. 14/107,150, filed Dec. 16, 2013, Non-Final Office Action dated Apr. 27, 2017.

U.S. Appl. No. 14/107,150, filed Dec. 16, 2013, Final Office Action dated Nov. 1, 2017.

U.S. Appl. No. 14/107,150, filed Dec. 16, 2013, Response to Final Office Action dated Nov. 1, 2017.

U.S. Appl. No. 14/107,150, filed Dec. 16, 2013, Advisory Office Action dated Jan. 30, 2018.

(56) References Cited

OTHER PUBLICATIONS

U.S. Appl. No. 14/809,762, filed Jul. 27, 2015, Notice of Allowance dated Sep. 13, 2017.
U.S. Appl. No. 14/107,150, filed Dec. 16, 2013, Examiners Answer dated Aug. 1, 2018.
U.S. Appl. No. 15/688,207, filed Aug. 28, 2017, Notice of Allowance dated Jul. 18, 2018.
Canadian Patent Application CA 2,991,067 filed on Jul. 26, 2016, Office Action dated Oct. 25, 2018.
Japanese Patent Application JP2018-500503 filed on Jul. 26, 2016, 1st Office Action dated Feb. 22, 2019.
European Patent Application 16747957.5 filed on Jul. 26, 2016, Office Action dated Feb. 4, 2019.

* cited by examiner

PROVIDING MULTI-FACTOR AUTHENTICATION CREDENTIALS VIA DEVICE NOTIFICATIONS

CROSS-REFERENCE TO RELATED APPLICATIONS

This application is a continuation-in-part of U.S. patent application Ser. No. 14/107,150 entitled "PROVIDING ACCOUNT INFORMATION TO APPLICATIONS" and filed on Dec. 16, 2013. This application is also a continuation-in-part of U.S. patent application Ser. No. 14/572,739 entitled "COMPUTING DEVICE WITH INTEGRATED AUTHENTICATION TOKEN" and filed on Dec. 16, 2014. Both applications are incorporated herein by reference in their entirety.

BACKGROUND

Multi-factor authentication is an access control approach that provides a higher degree of security than the single-factor approaches that have been traditionally employed. Multi-factor authentication may employ two or more authentication factors selected from what the user knows (e.g., passwords, knowledge-based questions, etc.), what the user has (e.g., a one-time password generated by a token, a one-time password sent via a different communication channel, etc.), and who the user is (e.g., fingerprint scans or other biometric data). For example, to successfully log in to a network service, a user may have to provide a username, a password, and a one-time password generated by a hardware token. Thus, a malicious user who has compromised the username and password cannot log in without also having access to the hardware token. One-time passwords may be generated via time-based one-time password algorithms, hash chains, and other approaches.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
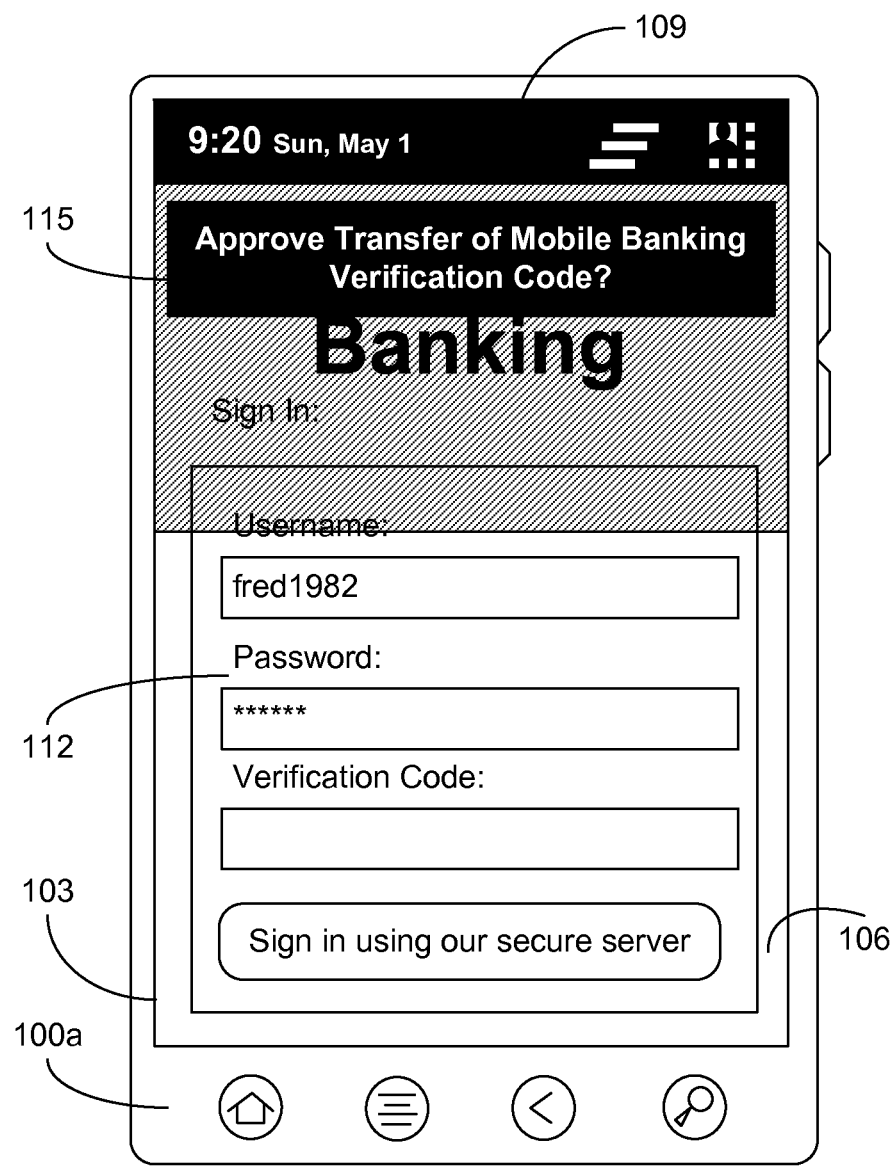
FIGS. 1A and 1B are pictorial diagrams of example user interfaces rendered by mobile devices according to various embodiments of the present disclosure.

The present disclosure relates to approaches for providing multi-factor authentication credentials. Multi-factor authentication is increasingly being deployed for use in logging into network sites or applications. While in times past a username and a password might have been all that was required to authenticate, network sites and applications now may require an additional authentication factor to be provided. In addition to having to prove what he or she knows (i.e., a password), a user may now have to prove what he or she has. This may involve one-time passwords that are generated by a user's device and/or sent to the user via a trusted communication channel (e.g., an email to a known address, a text message to a known telephone number, a voice call to a known telephone number, etc.).

The user may be asked to enter a one-time password into a network page or application form along with other security credentials, such as a username and password. This may be a simple procedure if the one-time password is displayed on one device and entered into a form on another device. In such a scenario, the user may simply view and type the one-time password. However, if the one-time password is presented by a first application and entered by the user via a second application, the user may have to memorize the one-time password shown by the first application, switch to the second application, and then attempt to enter the one-time password from memory. Such a process may involve inconveniently switching back and forth between the second application and the first application to enter portions of the one-time password, as the one-time password may stretch the bounds of the user's working memory.

Various embodiments of the present disclosure leverage device notifications in order to ease user entry of one-time passwords and/or other multi-factor authentication credentials that are obtained through different applications. Under the mobile application paradigm, which may be employed by operating systems that are not executed in mobile devices, the user interface of an application fills most of the device's display. Multi-tasking thus involves switching which single application is rendered upon the display, rather than using a windowed paradigm that may be inefficient for smaller display sizes. Nonetheless, a notification area rendered by the operating system may be shown along with the user interface of the application having focus. The notification area may show the current time, wireless network signal strength, battery condition, and other status information. As will be described herein, a one-time password or other credential may be shown in the notification area, which the user may then view and type into an application form field in order to perform multi-factor authentication.

In another embodiment, an approval request may be shown in the notifications area, and upon approval, the one-time password or other credential may be automatically transferred to the application that requests it, or to a server on behalf of the application. This automatic transfer may avoid the multiple context switches that might otherwise be required, with a user manually switching to an authenticator application and then switching back to the client application.

In other approaches, a proxy server may be used to communicate one or more authentication factors to or from an authentication endpoint, while one or more other authentication factors may be communicated by a client device to or from the authentication endpoint directly. The use of a proxy server that does not actually perform authentication functions may improve security. For example, if the proxy server were compromised by malicious actors, it may be that one-time passwords are intercepted. However, the one-time passwords are of limited utility by themselves, as they are time bound. Without the system to generate or validate the one-time passwords, a compromise of the proxy server alone would not allow authentication of malicious actors.

Referring to FIG. 1A, shown is an example mobile device 100a that facilitates entry of sign-in information in accordance with various embodiments of the present disclosure. The mobile device 100a includes a touchscreen display 103. Rendered upon the touchscreen display 103 are an application user interface 106 and a notification area 109. The application user interface 106 corresponds to the currently executing application that is given focus in the mobile device 100. In this example, the application user interface 106 corresponds to a mobile banking application ("Mobile Banking") and includes a sign-in form 112 that requests multiple authentication factors comprising a username, a password, and a verification code corresponding to a one-time password.

A user has selected the notification area 109 to be expanded. Within the expanded notification area 109 is a component 115 that, when selected, enables a one-time password corresponding to the mobile banking application to be entered into the sign-in form 112 for the verification code. Where multiple accounts are associated with the particular application or sign-in form, the user may select from among the multiple accounts using respective components 115 in the notification area 109. While in this example the component 115 is within an expanded notification area 109, in other examples the component 115 may be within a non-expanded notification area 109.

Figure 1B:
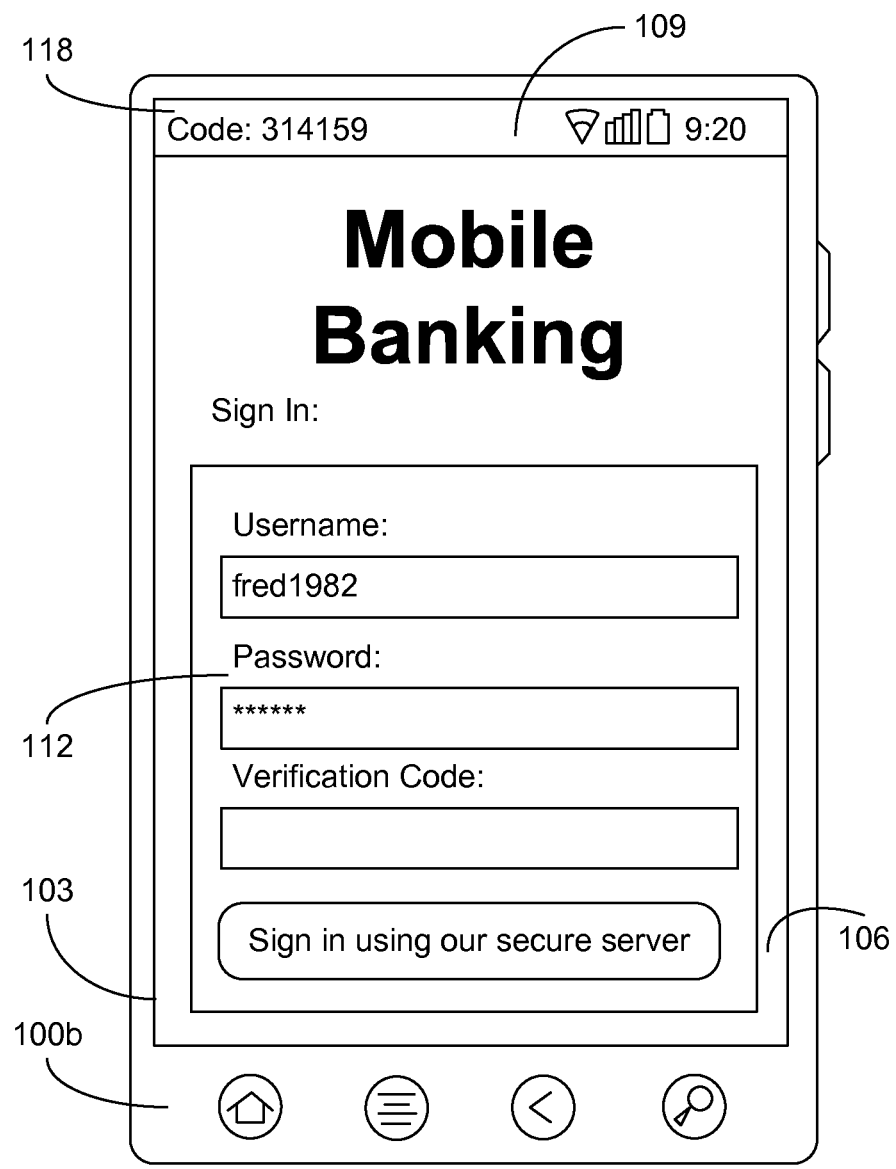

Turning now to FIG. 1B, shown is an example mobile device 100b that facilitates entry of sign-in information in accordance with various embodiments of the present disclosure. As compared to FIG. 1A, rather than including an approval component 115, the one-time password is itself displayed within the notification area 109 as component 118. In this example, the notification area 109 is non-expanded and the sign-in form 112 has focus. Consequently, the user can view the one-time password in the component 118 at the same time as entering the one-time password in a form field of the sign-in form 112. In the following discussion, a general description of the system and its components is provided, followed by a discussion of the operation of the same.

Figure 2A:
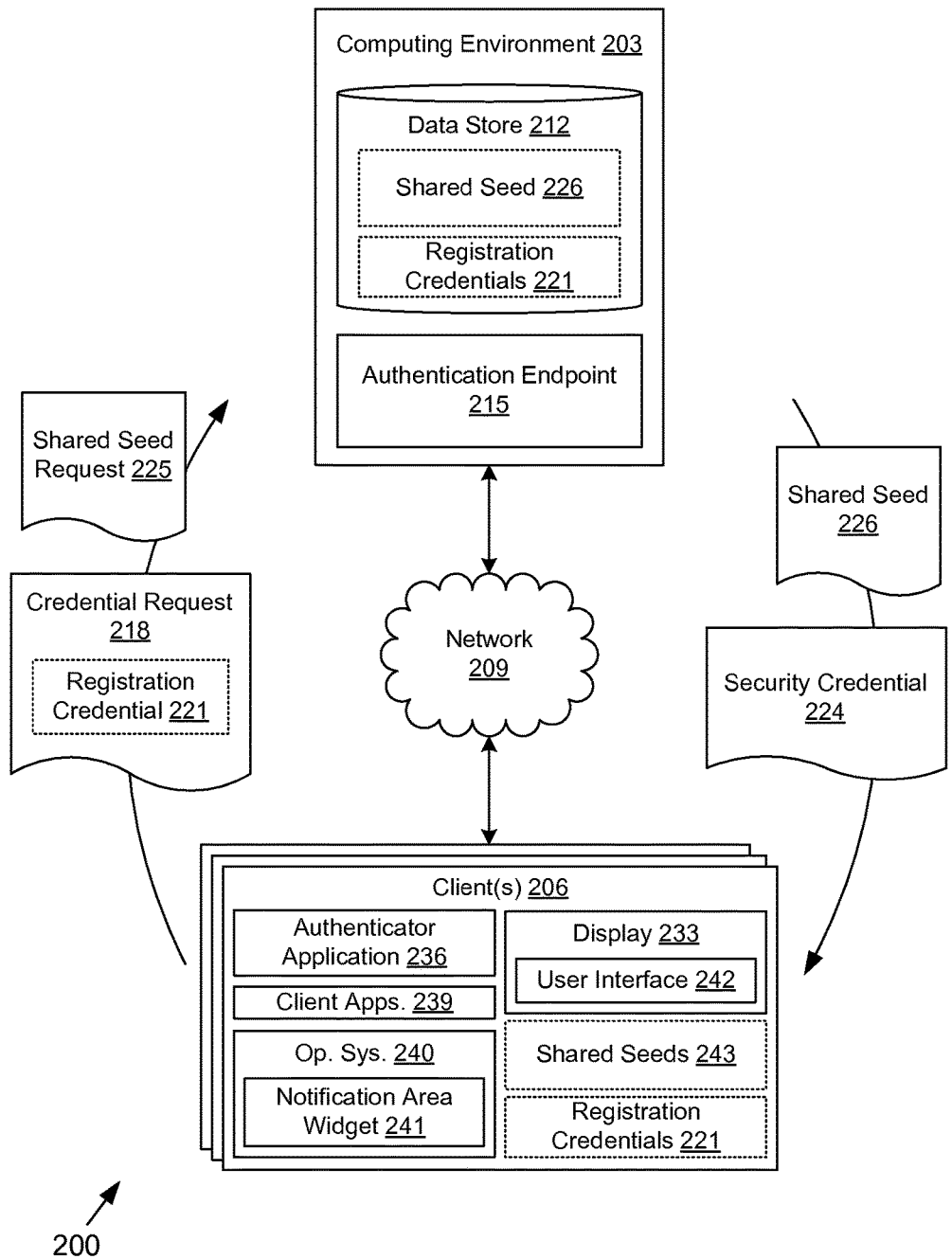
FIGS. 2A and 2B are schematic block diagrams of networked environments according to various embodiments of the present disclosure.

With reference to FIG. 2A, shown is a networked environment 200 according to various embodiments. The networked environment 200 includes a computing environment 203 and one or more clients 206 in data communication via a network 209. The network 209 includes, for example, the Internet, intranets, extranets, wide area networks (WANs), local area networks (LANs), wired networks, wireless networks, cable networks, satellite networks, or other suitable networks, or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a hosted or "cloud" computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an authentication endpoint 215 and other applications, services, processes, systems, engines, or functionality not discussed in detail herein. The authentication endpoint 215 is executed to facilitate authentication for a network resource. This authentication may take the form of multi-factor authentication. For example, the authentication endpoint 215 may receive traditional knowledge-based credentials such as username and password from the client 206, but the authentication endpoint 215 may also require an additional possession factor, such as a one-time password.

In one embodiment, the client 206 is configured to send a credential request 218 specifying a registration credential 221 to the authentication endpoint 215. Assuming that the registration credential 221 is valid, the authentication endpoint 215 may return a security credential 224 that may correspond to a one-time password. The registration credential 221 may correspond to a long-lived credential indicating authentication of the client 206 to receive the security credential 224. In another embodiment, the authentication endpoint 215 may receive shared seed requests 225 from clients 206 and then return shared seeds 226 for use in generating security credentials 224, assuming that the clients 206 are otherwise authenticated.

The authentication endpoint 215 may employ protocols such as hypertext transfer protocol (HTTP), simple object access protocol (SOAP), representational state transfer (REST), and/or other protocols. In one embodiment, the authentication endpoint 215 may comprise a commercially available HTTP server such as, for example, Apache® HTTP Server, Apache® Tomcat®, Microsoft® Internet Information Services (IIS), and others.

The data stored in the data store 212 includes, for example, shared seeds 226, registration credentials 221, and potentially other data. Additional stored data may include, for example, sign-in information, usernames, passwords, real names, network site names and domain names, uniform resource locators (URLs), payment instrument information (e.g., credit card numbers and associated information, checking account information, and so on), identification numbers, security keys, birthdates, answers to knowledge-based security questions, names of pets, birthplaces, and/or other information.

The client 206 is representative of a plurality of client devices that may be coupled to the network 209. The client 206 may comprise, for example, a processor-based system such as a computer system. Such a computer system may be embodied in the form of desktop computers, laptop computers, kiosks, personal digital assistants, cellular telephones, smartphones, set-top boxes, music players, web pads, tablet computer systems, game consoles, electronic book readers, point of sale (POS) terminals, credit card terminals, or other devices with like capability. The client 206 may include a display 233. The display 233 may comprise, for example, one or more devices such as touch-screens, liquid crystal display (LCD) displays, gas plasma-based flat panel displays, organic light emitting diode (OLED) displays, electrophoretic ink (E ink) displays, LCD projectors, or other types of display devices.

The client 206 may be configured to execute various applications and systems such as an authenticator application 236, client applications 239, an operating system 240, a notification area widget 241, and/or other applications. In one instance, the authenticator application 236 is executed to render a user interface 242 on the display 233 that enables users to configure the authenticator application 236 to provide security credentials 224, such as one-time passwords, for accounts. The authenticator application 236 may be configured to generate such security credentials 224 using shared seeds 243 or may be configured to obtain such credentials from a server, such as the authentication endpoint 215, by way of registration credentials 221.

The client applications 239 may be executed in a client 206, for example, to access network content served up by the computing environment 203 and/or other servers, thereby rendering a user interface 242 on the display 233. Each client application 239 may, for example, correspond to a browser, a mobile application, a shopping application, a banking application, a music playing application, a video application, a gaming application, a social application, and/or other applications that may request information from users to operate from time to time. The client applications 239 may correspond to native applications, web applications, hybrid applications, or other applications.

The authenticator application 236 may be integrated with the operating system 240 such that security credentials 224 are made available as users execute the various client applications 239. For example, the operating system 240 may include a notification area widget 241, such as the status bar found on the Android® platform. The notification area widget 241 may be accessible via the display 233 while a user interface 242 of a client application 239 is being rendered upon the display 233. The authenticator application 236 may add one or more notification components to the notification area widget 241, such that selection of a notification component may approve security credentials 224 to be provided to the currently executing client application 239. Alternatively, the notification area widget 241 may be configured to render a security credential 224 so that a user may enter it into a form field of the user interface 242 of the client application 239 manually.

Techniques for providing stored account information to applications via a status bar are described in U.S. patent application Ser. No. 14/107,150 entitled "PROVIDING ACCOUNT INFORMATION TO APPLICATIONS" and filed on Dec. 16, 2013, which is incorporated herein by reference in its entirety. Techniques for rendering authentication codes upon a display are described in U.S. patent application Ser. No. 14/572,739 entitled "COMPUTING DEVICE WITH INTEGRATED AUTHENTICATION TOKEN" and filed on Dec. 16, 2014, which is incorporated herein by reference in its entirety.

Figure 2B:
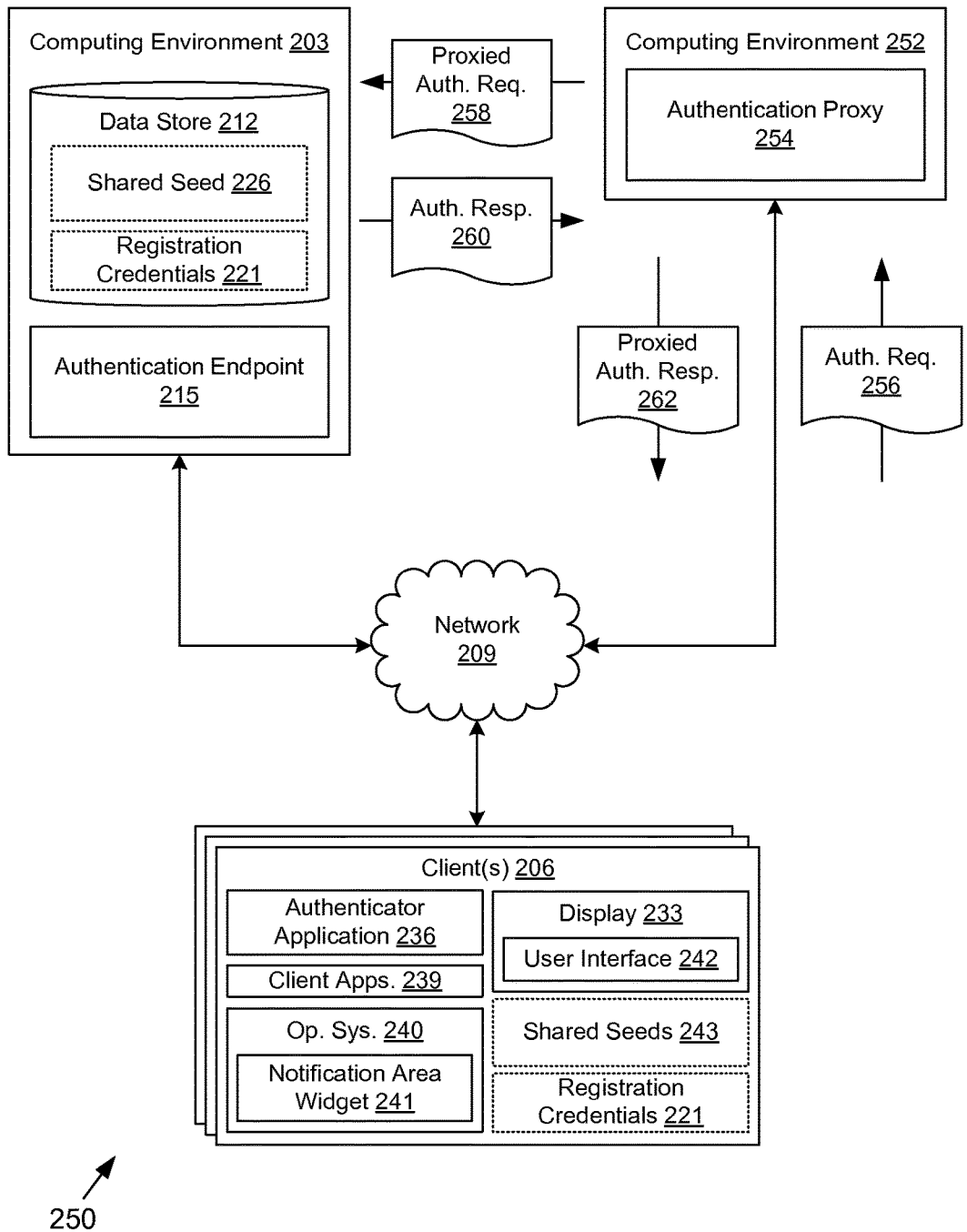

With reference to FIG. 2B, shown is another networked environment 250 according to various embodiments. The networked environment 250 includes a computing environment 203, a computing environment 252, and one or more clients 206 in data communication via a network 209. The computing environment 252 may be similar to the computing environment 203 but may be operated by a different entity and/or may be maintained with some level of network separation from the computing environment 203.

Executed upon the computing environment 252 is an authentication proxy 254. The authentication proxy 254 may be used to provide a level of separation from generation and/or interpretation of security credentials 224 (FIG. 2A). In this embodiment, the authenticator application 236 on the client 206 communicates with the authentication proxy 254 via an authentication request 256. The authentication proxy 254 simply passes the authentication request 256 to the authentication endpoint 215 of the computing environment 203 via a proxied authentication request 258. The authentication endpoint 215 generates an authentication response 260, which is returned to the authentication proxy 254. The authentication proxy 254 returns the authentication response 260 to the client 206 as the proxied authentication response 262. Alternatively, rather than being initiated by the client 206, the communication described above may be initiated by the authentication endpoint 215.

The proxy architecture of FIG. 2B may be used to provide a layer of separation for the communication and receipt of one of multiple factors in multi-factor authentication. In one scenario, the authenticator application 236 may communicate with the authentication proxy 254 to authorize access by a client application 239, where the client application 239 has already provided a different authentication factor to the authentication endpoint 215. For example, a push notification may be sent from the authentication endpoint 215 to the authenticator application 236 by way of the authentication proxy 254.

The user may approve the authentication using the authenticator application 236, with the approval being sent via the authentication proxy 254 to the authentication endpoint 215. The approval may include a one-time password, or the use of a public-private key pair. In some examples, the public-private key pair may be built-in to the client 206, such as with ACTIVE DIRECTORY. The authentication proxy 254 does not perform the verification of the result returned by the client 206 (i.e., the authentication request 256). To the contrary, the authentication proxy 254 may be incapable of validating or verifying the authentication factor supplied by the client 206. In this regard, the keys and/or shared seed 226 to perform this verification may be maintained at the computing environment 203. The authentication endpoint 215 may perform this verification, or the verification may be handled by a separate service (e.g., a Remote Authentication Dial In User Service (RADIUS) server) in the computing environment 203.

Meanwhile, additional authentication factors (e.g., a password) are provided by the client 206 to the authentication endpoint 215 directly, without proxying by the authentication proxy 254. In some implementations, the authentication endpoint 215 may enforce a requirement that the authenticator application 236 and the client application 239 to be authenticated be executed by separate clients 206. This may be enforced with reference to internet protocol (IP) address, media access control (MAC) address, operating system identifiers, device identifiers, and/or other types of identifiers that may uniquely identify a client 206.

Figure 3:
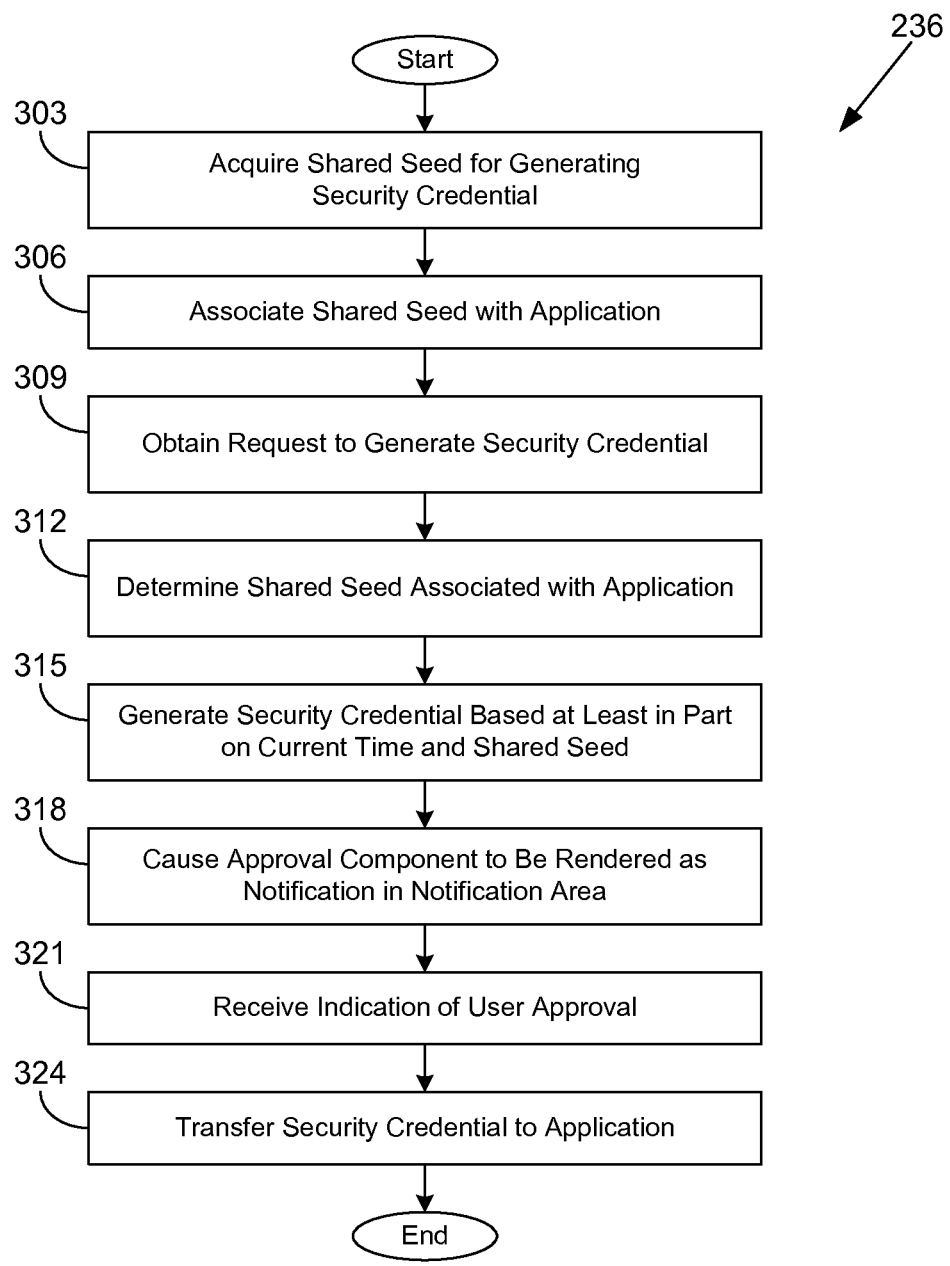
FIGS. 3-5 are flowcharts illustrating examples of functionality implemented as portions of an authenticator application executed in a client in the networked environment of FIG. 2A according to various embodiments of the present disclosure.

Referring next to FIG. 3, shown is a flowchart that provides one example of the operation of a portion of the authenticator application 236 according to an embodiment. It is understood that the flowchart of FIG. 3 provides merely an example of the many different types of functional arrangements that may be employed to implement the operation of the portion of the authenticator application 236 as described herein. As an alternative, the flowchart of FIG. 3 may be viewed as depicting an example of elements of a method implemented in the client 206 according to one or more embodiments.

Beginning with box 303, the authenticator application 236 acquires a shared seed 243 (FIG. 2A) for generating a security credential 224 (FIG. 2A). For example, the authenticator application 236 may acquire the shared seed 243 from an image containing a quick-response (QR) code, a barcode, machine readable text, etc. The shared seed 243 may also be transmitted via near-field communication (NFC), BLUETOOTH, WI-FI, infrared, acoustic coupling, and/or other wireless technologies. In some cases, acquiring a shared seed 243 may involve generating a seed and sharing it with the authentication endpoint 215 via the network 209 (FIG. 2A). In box 306, the authenticator application 236 associates the shared seed 243 with one or more client applications 239 (FIG. 2A) or accounts. It may be that different shared seeds 243 may be used for different accounts or client applications 239.

In box 309, the authenticator application 236 obtains a request to generate a security credential 224. The request may be received from a client application 239. For example, the authenticator application 236 may be associated with a particular scheme name (e.g., "authenticator"), and the client application 239 may invoke the authenticator application 236 via a uniform resource locator (URL) such as "authenticator:// generatePassword/appID=UID," where UID corresponds to a unique identifier for a particular client application 239. An account identifier may also be specified. In another scenario, the request may be pushed by way of the authentication endpoint 215 (FIG. 2A) to the registered authenticator application 236.

In box 312, the authenticator application 236 determines a shared seed 243 associated with the client application 239. In box 315, the authenticator application 236 generates a security credential 224 based at least in part on the current time and the determined shared seed 243. Other algorithms to generate the security credential 224 may be used in other embodiments.

In box 318, the authenticator application 236 causes an approval component to be rendered as a notification in the notification area widget 241 (FIG. 2A), similarly to the example of FIG. 1A. The approval component may indicate to the user that a particular client application 239 has requested access to a particular security credential 224. The user may choose to approve or deny the request to transfer the security credential 224 to the client application 239.

In box 321, the authenticator application 236 receives an indication of user approval. In one example, a user may simply select a button or other user interface component to indicate approval. In another example, the user may have to provide a fingerprint or other biometric identifier to further safeguard the approval process. The authenticator application 236 may be configured to verify the biometric identifier before deeming a user approval to have occurred. The client 206 may incorporate fingerprint recognition technology in the touchscreen display 233, or a separate device may be present in the client 206 to receive fingerprints. In some cases where fingerprint recognition is required, the authenticator application 236 may require recognition of specific fingers corresponding to a particular user. In yet another example, the user may be required to enter a personal identification number (PIN) or other identifier to facilitate user approval. In various scenarios, the user approval may correspond to a parental control, such that a fingerprint or other identifier of a parent may be required before a child user is able to access an application or resource via a transfer of security credentials 224.

In box 324, the authenticator application 236 transfers the security credential 224 to the client application 239 in response to the user approval. For example, the security credential 224 may be automatically transferred by the authenticator application 236 invoking a URL with a scheme name associated with the particular client application 239, e.g., "clientApplication://code=314159," where "314159" is the security credential 224. In some cases, the authenticator application 236 may be configured to automatically transfer the security credential 224 to a server. Thereafter, the portion of the authenticator application 236 ends.

Figure 4:
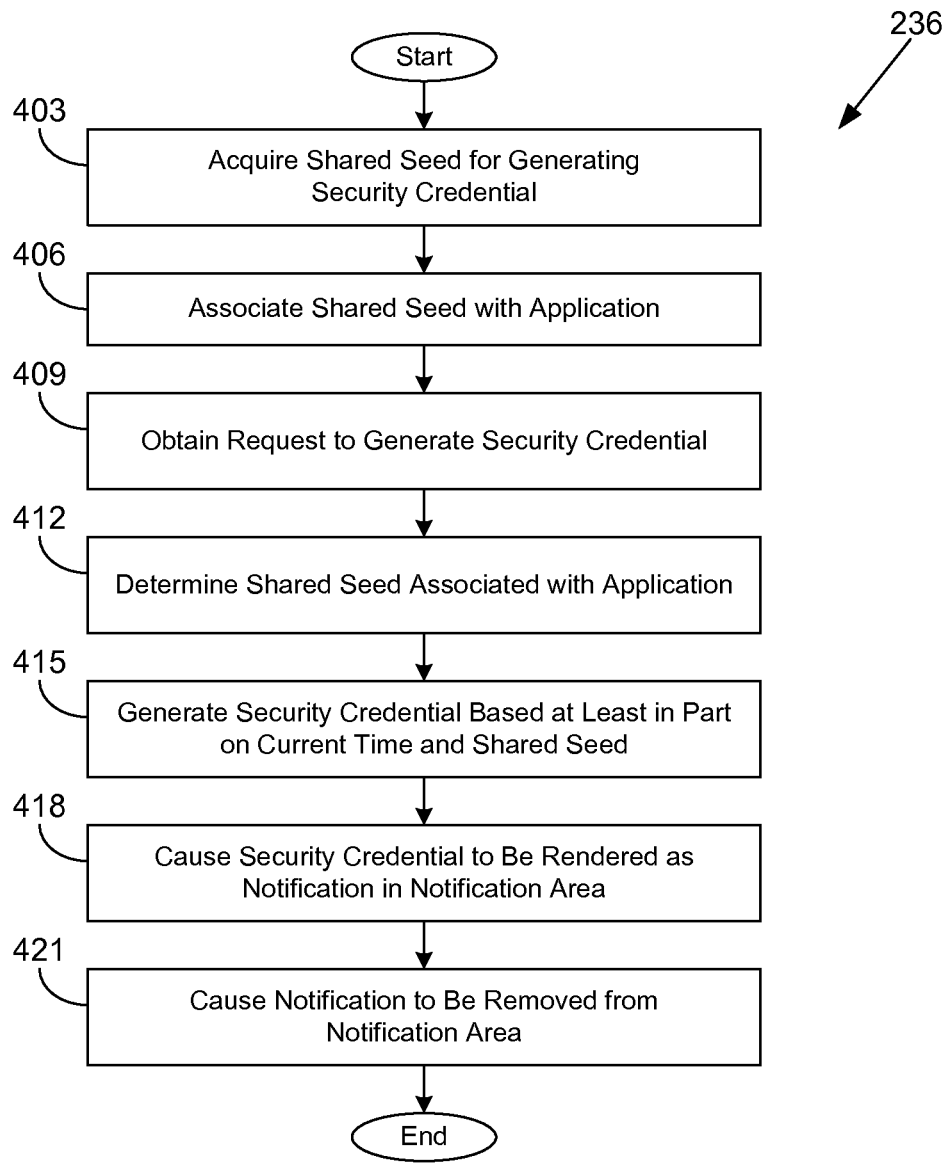

Moving on to FIG. 4, shown is a flowchart that provides one example of the operation of a portion of the authenticator application 236 according to another embodiment. It is understood that the flowchart of FIG. 4 provides merely an example of the many different types of functional arrangements that may be employed to implement the operation of the portion of the authenticator application 236 as described herein. As an alternative, the flowchart of FIG. 4 may be viewed as depicting an example of elements of a method implemented in the client 206 according to one or more embodiments.

Beginning with box 403, the authenticator application 236 acquires a shared seed 243 (FIG. 2A) for generating a security credential 224 (FIG. 2A). For example, the authenticator application 236 may acquire the shared seed 243 from an image containing a quick-response (QR) code, a barcode, machine readable text, etc. The shared seed 243 may also be transmitted via near-field communication (NFC), BLUETOOTH, WI-FI, infrared, acoustic coupling, and/or other wireless technologies. In some cases, acquiring a shared seed 243 may involve generating a seed and sharing it with the authentication endpoint 215 via the network 209 (FIG. 2A). In box 406, the authenticator application 236 associates the shared seed 243 with one or more client applications 239 (FIG. 2A) or accounts. It may be that different shared seeds 243 may be used for different accounts or client applications 239.

In box 409, the authenticator application 236 obtains a request to generate a security credential 224. The request may be received from a client application 239. For example, the authenticator application 236 may be associated with a particular scheme name (e.g., "authenticator"), and the client application 239 may invoke the authenticator application 236 via a uniform resource locator (URL) such as "authenticator:// generatePassword/appID=UID," where UID corresponds to a unique identifier for a particular client application 239. An account identifier may also be specified. In another scenario, the request may be pushed by way of the authentication endpoint 215 (FIG. 2A) to the registered authenticator application 236.

In box 412, the authenticator application 236 determines a shared seed 243 associated with the client application 239. In box 415, the authenticator application 236 generates a security credential 224 based at least in part on the current time and the determined shared seed 243. Other algorithms to generate the security credential 224 may be used in other embodiments.

In box 418, the authenticator application 236 causes the generated security credential 224 to be rendered as a notification in the notification area widget 241, similarly to the example of FIG. 1B. The user may then view the security credential 224 and enter it manually into a form field of a user interface 242 (FIG. 2A) rendered by the client application 239. Thus, the notification may be rendered concurrently on the display 233 (FIG. 2A) along with the user interface 242 of the client application 239.

This may be significant especially from the standpoint of operating systems 240 that are configured to render at most one application user interface 242 at a time upon the display 233, such as with mobile devices. For example, the user interface 242 and the notification area widget 241 may be configured to fill an entirety of the display 233 when the security credential 224 is rendered in the notification area widget 241.

In box 421, the authenticator application 236 may cause the notification containing the security credential 224 to be removed from the notification area widget 241. This may be done after an elapse of a predefined amount of time or in response to a communication indicating that the security credential 224 has been used. For example, the client application 239 or the authentication endpoint 215 (FIG. 2A) may have a callback to the authenticator application 236 that indicates that the security credential 224 has been used. The authenticity of the communication from the authentication endpoint 215 may be confirmed via the use of X.509 certificates, secure sockets layer (SSL), and/or other technologies. A push or pull communication arrangement between the authenticator application 236 and the authentication endpoint 215 or client application 239 may be used by the authenticator application 236 to receive this communication. Thereafter, the portion of the authenticator application 236 ends.

Figure 5:
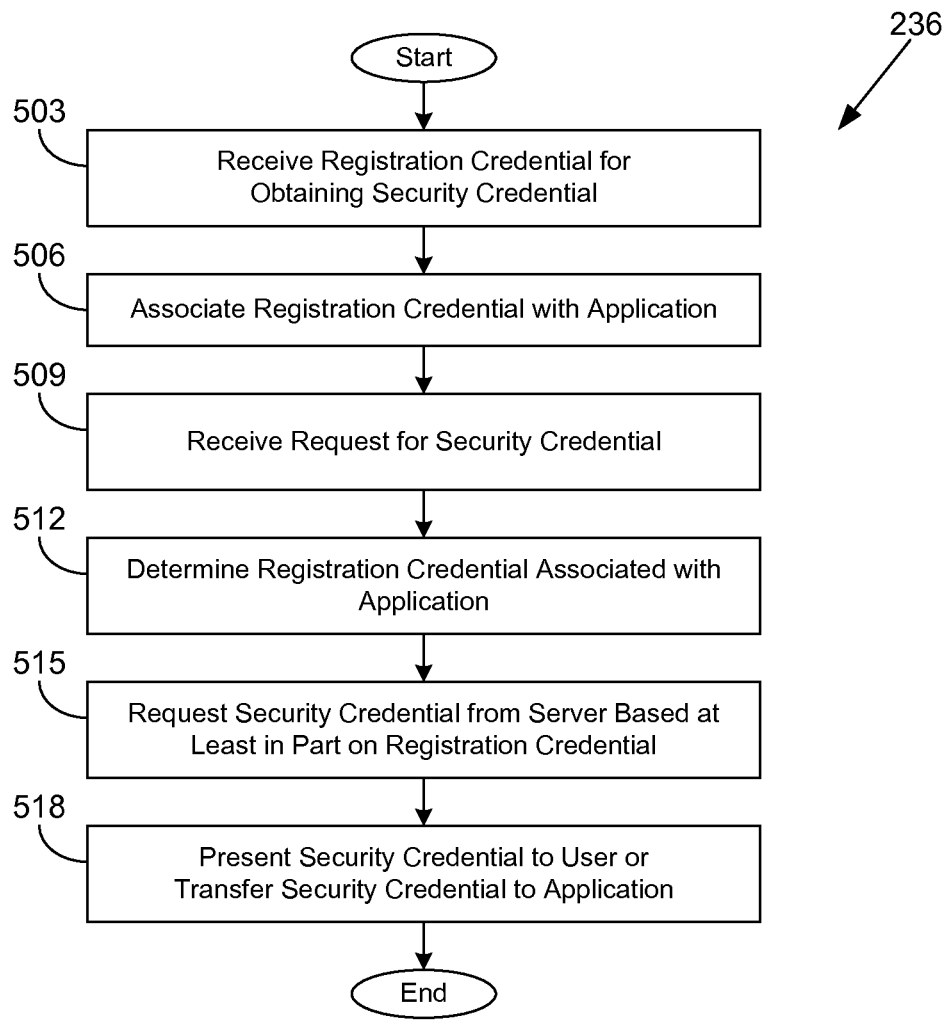

Continuing to FIG. 5, shown is a flowchart that provides one example of the operation of a portion of the authenticator application 236 according to still another embodiment. It is understood that the flowchart of FIG. 5 provides merely an example of the many different types of functional arrangements that may be employed to implement the operation of the portion of the authenticator application 236 as described herein. As an alternative, the flowchart of FIG. 5 may be viewed as depicting an example of elements of a method implemented in the client 206 according to one or more embodiments.

Beginning with box 503, the authenticator application 236 receives a registration credential 221 (FIG. 2A) for obtaining a security credential 224 (FIG. 2A) from an authentication endpoint 215 (FIG. 2A). The registration credential 221 may be a long-lived credential. The client 206 may be authenticated in order to receive the registration credential 221. In box 506, the authenticator application 236 associates the registration credential 221 with one or more client applications 239 (FIG. 2A) or accounts.

In box 509, the authenticator application 236 receives a request for a security credential 224. For example, the authenticator application 236 may be associated with a particular scheme name (e.g., "authenticator"), and the client application 239 may invoke the authenticator application 236 via a uniform resource locator (URL) such as "authenticator:// generatePassword/appID=UID," where UID corresponds to a unique identifier for a particular client application 239. An account identifier may also be specified. In another scenario, the request may be pushed by way of the authentication endpoint 215 (FIG. 2A) to the registered authenticator application 236. In box 512, the authenticator application 236 determines a registration credential 221 associated with the client application 239.

In box 515, the authenticator application 236 requests a security credential 224 from the authentication endpoint 215 (FIG. 2A) via the network 209 (FIG. 2A) based at least in part on the registration credential 221. In other words, the authenticator application 236 is able to authenticate with the authentication endpoint 215 using the registration credential 221 for the purpose of receiving the security credential 224. In box 518, the authenticator application 236 either presents the security credential 224 to the user as in box 418 of FIG. 4 or transfers the security credential 224 to the client application 239 as in boxes 318 through 324 of FIG. 3. In some cases, the authenticator application 236 may be configured to automatically transfer the security credential 224 to a server. Thereafter, the portion of the authenticator application 236 ends.

Figure 6:
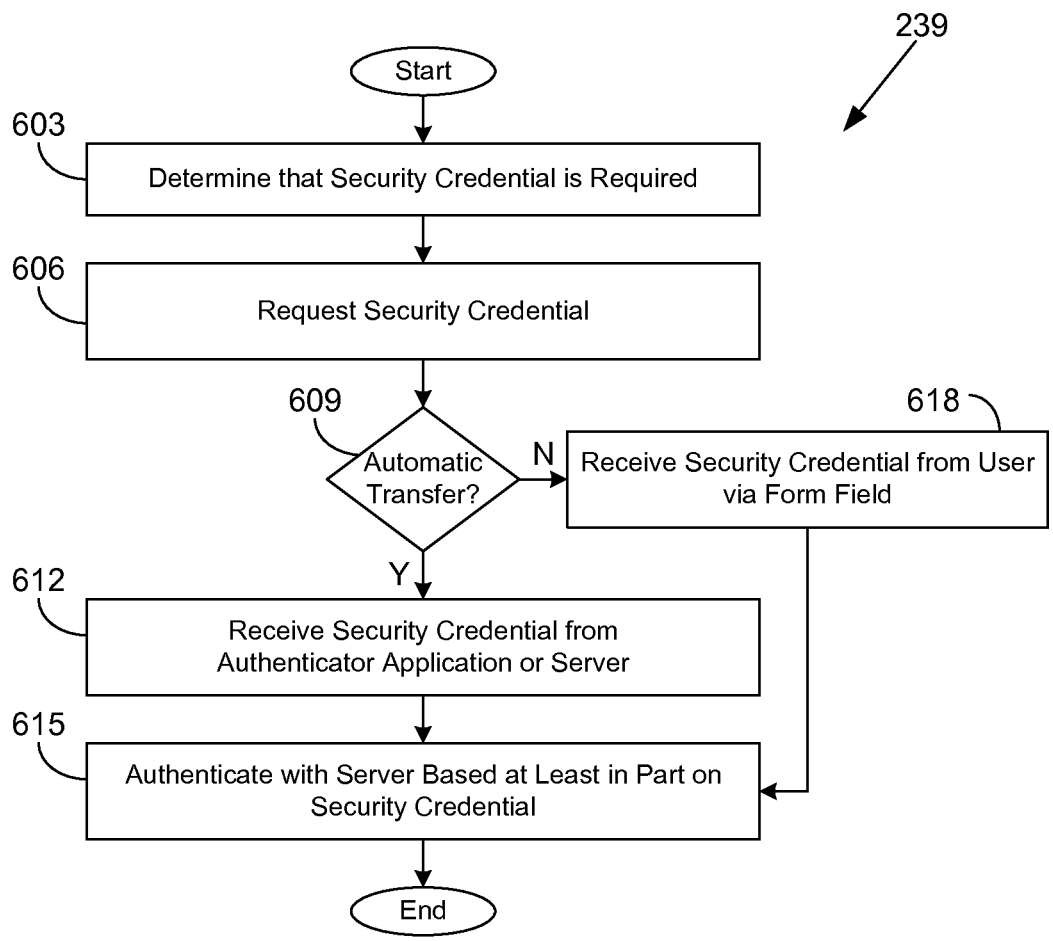
FIG. 6 is a flowchart illustrating one example of functionality implemented as portions of a client application executed in a client in the networked environment of FIG. 2A according to various embodiments of the present disclosure.

Referring next to FIG. 6, shown is a flowchart that provides one example of the operation of a portion of the client application 239 according to various embodiments. It is understood that the flowchart of FIG. 6 provides merely an example of the many different types of functional arrangements that may be employed to implement the operation of the portion of the client application 239 as described herein. As an alternative, the flowchart of FIG. 6 may be viewed as depicting an example of elements of a method implemented in the client 206 (FIG. 2A) according to one or more embodiments.

Beginning with box 603, the client application 239 determines that a security credential 224 (FIG. 2A) is required. In box 603, the client application 239 may request the security credential 224 from an authenticator application 236 (FIG. 2A). Alternatively, the client application 239 may request the security credential 224 from a server. In some scenarios, the security credential 224 may be specific to the particular client application 239 or an account used by the client application 239. For example, the client application 239 may invoke the authenticator application 236 via a uniform resource locator (URL) such as "authenticator://generatePassword/appID=UID,"where UID corresponds to a unique identifier for the particular client application 239. Alternatively, the client application 239 may simply render a user interface 242 that prompts a user to enter the security credential 224, and the user may manually invoke the authenticator application 236 to provide the security credential 224. If the client application 239 and the authenticator application 236 are executed on different clients 206, a direct network connection may be established between the different clients 206 to request and/or exchange the security credential 224.

In box 606, the client application 239 determines whether the security credential 224 is to be automatically transferred. If the security credential 224 is to be automatically transferred, the client application 239 receives the security credential 224 from the authenticator application 236 in box 612. For example, the authenticator application 236 may invoke a URL with a scheme name associated with the particular client application 239, e.g., "clientApplication:// code=314159," where "314159" is the security credential 224. With automatic transfer, unnecessary context switches between the client application 239 and the authenticator application 239 are avoided. In some cases, the security credential 224 may be received from a server that is in communication with the authenticator application 239 via the network 209. Upon automatic transfer, a form field of a user interface 242 may be prepopulated with the security credential 224. The client application 239 proceeds to box 615.

If the client application 239 does not use automatic transfer to receive the security credential 224, the client application 239 moves from box 609 to box 618 and receives the security credential 224 manually from the user via a form field of a user interface 242. The notification area widget 241 (FIG. 2A) may render a notification component showing the security credential 224, and the user may view and enter the security credential 224 at the same time. The client application 239 then moves to box 615.

In box 615, the client application 239 authenticates with the authentication endpoint 215 (FIG. 2A) based at least in part on the security credential 224. In one example, the security credential 224 is just one of several authenticator factors to be provided to the authentication endpoint 215 to successfully authenticate. The user interface 242 of the client application 239 may elicit other factors such as a username, password, biometric factors, and so on. Upon authentication, the client application 239 may be enabled to access secured network resources. Thereafter, the portion of the client application 239 ends.

Figure 7:
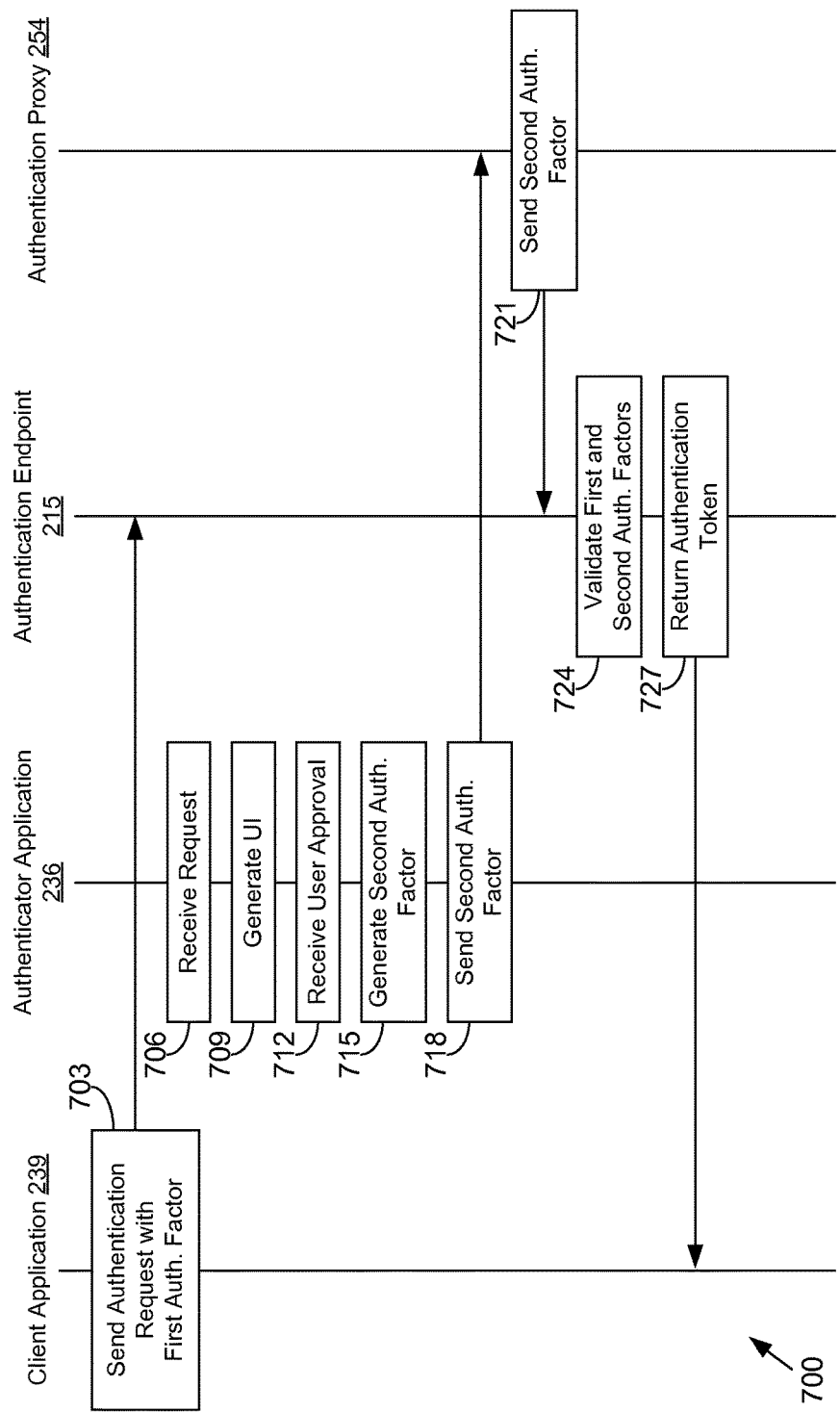
FIG. 7 is a sequence diagram illustrating one example of interaction between a client application, an authenticator application, an authentication endpoint, and an authentication proxy in the networked environment of FIG. 2B according to various embodiments of the present disclosure.

Moving on to FIG. 7, shown is a sequence diagram 700 that provides one example of interaction between the client application 239, the authenticator application 236, the authentication endpoint 215, and the authentication proxy 254 according to various embodiments. It is understood that the sequence diagram 700 of FIG. 7 provides merely an example of the many different types of functional arrangements as described herein.

Beginning with box 703, the client application 239 generates an authentication request specifying a first authentication factor. The authentication request is then sent to the authentication endpoint 215. For example, the client application 239 may request authentication by a username and password combination. Alternatively, the client application 239 may merely inform the authentication endpoint 215 or the authenticator application 236 that authentication is requested.

In box 706, the authentication endpoint 215 requests a second authentication factor from the authenticator application 236. Alternatively, the request for the second authentication factor may originate in the client application 239. Alternatively, a user may explicitly invoke the authenticator application 236. Where the authenticator application 236 and the client application 239 are executed in different clients 206 (FIG. 2A), a discovery procedure on a local network may be employed to enable communication.

In box 709, the authenticator application 236 generates a user interface 242 configured to receive a user approval for the client application 239 to proceed with authentication. For example, the authenticator application 236 may render an approval button that when selected indicates that the user approves of the authentication of the client application 239. In box 712, the authenticator application 236 receives a user approval via the user interface 242. In box 715, the authenticator application 236 generates a second authentication factor, e.g., a one-time password. Alternatively, the authenticator application 236 may receive the second authentication factor from a server.

The authenticator application 236 then sends the second authentication factor to the authentication proxy 254. The authentication proxy 254 is an authentication service that acts as a proxy for the authentication endpoint 215. The authentication proxy 254 may be incapable of verifying the second authentication factor. In box 721, the authentication proxy 254 forwards the second authentication factor to the authentication endpoint 215. By now, the authentication endpoint 215 has received multiple authentication factors for the authentication request but from multiple sources—the client application 239 and the authenticator application 236 (by way of the authentication proxy 254).

In box 724, the authentication endpoint 215 validates the first and second authentication factors. Also, the authentication endpoint 215 may verify that the first and second authentication factors were provided by way of different clients 206. In box 727, having authenticated the client application 239, the authentication endpoint 215 may return an authentication token to the client application 239. Thereafter, the sequence diagram 700 ends.

Figure 8:
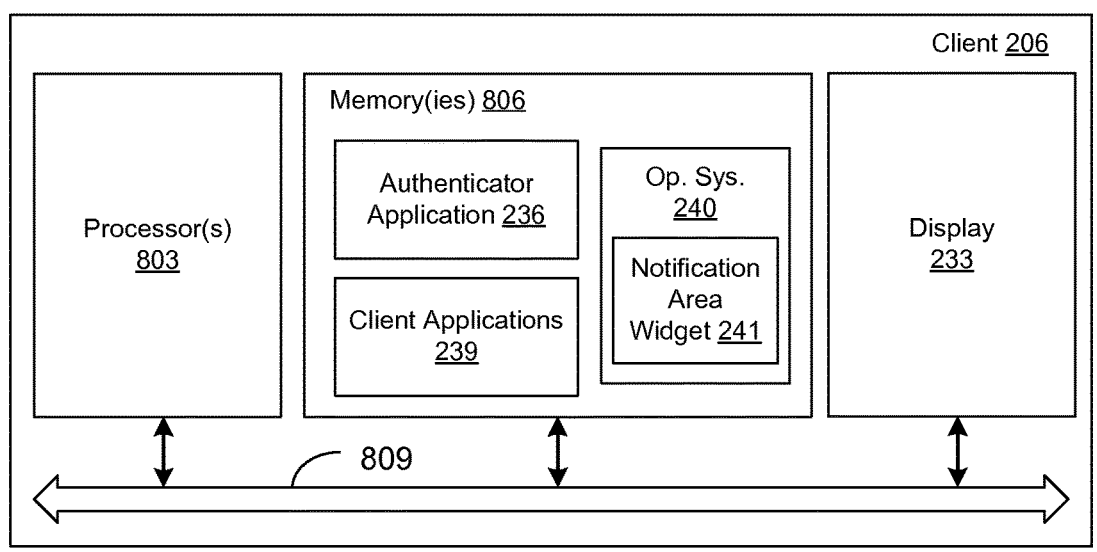
FIG. 8 is a schematic block diagram that provides one example illustration of a computing environment employed in the networked environment of FIG. 2A according to various embodiments of the present disclosure.

With reference to FIG. 8, shown is a schematic block diagram of the client 206 according to an embodiment of the present disclosure. The client 206 includes at least one processor circuit, for example, having a processor 803 and a memory 806, both of which are coupled to a local interface 809. The local interface 809 may comprise, for example, a data bus with an accompanying address/control bus or other bus structure as can be appreciated. The computing environment 203 (FIG. 2A) may be made up of one or more computing devices with like structure.

Stored in the memory 806 are both data and several components that are executable by the processor 803. In particular, stored in the memory 806 and executable by the processor 803 are an authenticator application 236, client applications 239, and potentially other applications. Also stored in the memory 806 may be a data store. In addition, an operating system 240 with a notification area widget 241 may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the authenticator application 236, the client applications 239, the operating system 240, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 and the sequence diagram of FIG. 7 show the functionality and operation of an implementation of portions of the authenticator application 236, the client application 239, the authentication endpoint 215, and/or the authentication proxy 254. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 3-6 and the sequence diagram of FIG. 7 show a specific order of execution, it is understood that the order of execution may differ from that which is depicted. For example, the order of execution of two or more blocks may be scrambled relative to the order shown. Also, two or more blocks shown in succession in FIGS. 3-7 may be executed concurrently or with partial concurrence. Further, in some embodiments, one or more of the blocks shown in FIGS. 3-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authenticator application 236, the client applications 239, and the operating system 240, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the authenticator application 236, the client applications 239, and the operating system 240, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Embodiments of the disclosure can be described in view of the following clauses:

Clause 1. A non-transitory computer-readable medium embodying a first application executable in a computing device, comprising: code that acquires a shared seed from an image; code that associates the shared seed with a second application; code that generates a one-time password based at least in part on a current time and the shared seed; code that, in response to receiving a request from the second application via a first uniform resource locator (URL), generates a notification in an operating system notification area of a display of the computing device; code that facilitates entry of a user approval via the notification; and code that, in response to receiving the user approval, transfers the one-time password to the second application via a second URL.

Clause 2. The non-transitory computer-readable medium of clause 1, wherein the first URL includes a first scheme name associated with the first application, and the second URL includes a second scheme name associated with the second application.

Clause 3. The non-transitory computer-readable medium of clauses 1 to 2, wherein the notification includes the one-time password.

Clause 4. A system, comprising: at least one computing device; and a first application executed in the at least one computing device, the first application comprising: logic that generates a notification in a notification area of a display of the at least one computing device; logic that facilitates entry of a user approval via the notification; and logic that, in response to receiving the user approval, transfers a security credential to a second application executed in the at least one computing device.

Clause 5. The system of clause 4, wherein the logic that generates the notification is configured to generate the notification in response to a request from the second application.

Clause 6. The system of clauses 4 to 5, wherein the logic that generates the notification is configured to generate the notification in response to a request from a server.

Clause 7. The system of clauses 4 to 6, wherein the security credential is a one-time password.

Clause 8. The system of clauses 4 to 7, wherein the first application further comprises logic that receives the one-time password from a server via a network.

Clause 9. The system of clauses 4 to 8, wherein the first application further comprises logic that generates the one-time password.

Clause 10. The system of clauses 4 to 9, wherein the first application further comprises logic that acquires a seed from an image, the seed being used to generate the one-time password.

Clause 11. The system of clauses 4 to 10, wherein the first application receives a request via a first uniform resource locator (URL) having a first scheme name associated with the first application, and the second application receives the security credential via a second URL having a second scheme name associated with the second application.

Clause 12. The system of clauses 4 to 11, wherein the notification area is rendered on the display concurrently with a user interface of the second application.

Clause 13. The system of clauses 4 to 12, wherein the security credential is specific to the second application.

Clause 14. The system of clauses 4 to 13, wherein the second application employs a plurality of authentication factors, and the security credential corresponds to one of the plurality of authentication factors.

Clause 15. The system of clauses 4 to 14, wherein the at least one computing device is configured to render one application user interface upon the display at a time.

Clause 16. A method, comprising: determining, by a first application executed via at least one of one or more computing devices, a security credential; causing the security credential to be rendered in a notification area upon a display of at least one of the one or more computing devices while a user interface of a second application executed via at least one of the one or more computing devices is also rendered upon the display; and receiving, by the second application executed via at least one of the one or more computing devices, the security credential by way of a form field of the user interface.

Clause 17. The method of clause 16, further comprising sending by the second application a request to display the security credential to the first application.

Clause 18. The method of clauses 16 to 17, wherein the request to display the security credential is sent via a uniform resource locator (URL) that includes a scheme name registered to the first application.

Clause 19. The method of clauses 16 to 18, wherein determining the security credential further comprises: generating, by the first application, a one-time password based at least in part on a current time and a shared seed; and identifying, by the first application, the shared seed from a plurality of seeds based at least in part on the second application.

Clause 20. The method of clauses 16 to 19, wherein the user interface and the notification area fill an entirety of the display when the security credential is rendered in the notification area.

Clause 21. A non-transitory computer-readable medium embodying a first application and a second application executable in at least one computing device, comprising: code that determines that the first application has requested an authentication; code that causes a first user interface to be rendered by the second application, the first user interface eliciting a user approval of the authentication; code that generates a one-time password by the second application; code that automatically transfers the one-time password to the first application in response to receiving the user approval; code that causes a second user interface to be rendered by the first application, the second user interface including a first form field prepopulated with the one-time password and a second form field configured to receive a user-specified security credential; and code that submits the one-time password and the user-specified security credential to at least one authentication service to complete the authentication of the first application.

Clause 22. The non-transitory computer-readable medium of clause 21, wherein the at least one authentication service comprises a first authentication service and a second authentication service, the user-specified security credential is submitted to the first authentication service, the one-time password is submitted to the second authentication service, and the second authentication service acts as a proxy for the first authentication service.

Clause 23. A system, comprising: at least one computing device; a first application executed in the at least one computing device, the first application comprising: logic that sends an authentication request to a first authentication service, the authentication request specifying a first authentication factor; and a second application executed in the at least one computing device, the second application comprising: logic that generates a user interface on a display of the at least one computing device, the user interface facilitating entry of a user approval; and logic that, in response to receiving the user approval, sends a second authentication factor to a second authentication service, wherein the second authentication service operates as a proxy for the first authentication service.

Clause 24. The system of clause 23, wherein the first authentication service and the second authentication service are operated by different entities.

Clause 25. The system of clauses 23 to 24, wherein the second authentication service is incapable of validating the second authentication factor.

Clause 26. The system of clauses 23 to 25, wherein the logic that generates the user interface is configured to generate the user interface in response to a request from the second authentication service.

Clause 27. The system of clauses 23 to 26, wherein the logic that generates the user interface is configured to generate the user interface in response to a request from the first application.

Clause 28. The system of clauses 23 to 27, wherein the at least one computing device comprises a first computing device and a second computing device, the first application is executed in the first computing device, and the second application is executed in the second computing device.

Clause 29. The system of clauses 23 to 28, wherein the first authentication service is configured to verify that the first application and second application are executed in different computing devices.

Clause 30. The system of clauses 23 to 29, wherein the at least one computing device comprises a single computing device, and both the first application and the second application are executed in the single computing device.

Clause 31. The system of clauses 23 to 30, wherein the user interface comprises a notification in a notification area.

Clause 32. A method, comprising: determining, via at least one of one or more computing devices, that a first application has requested an authentication; causing, via at least one of the one or more computing devices, a user interface to be rendered by a second application, the user interface eliciting a user approval; receiving, via at least one of the one or more computing devices, the user approval by the second application; and automatically transferring, via at least one of the one or more computing devices, an authentication factor to a recipient in response to the user approval, wherein the authentication factor corresponds to one of a plurality of authentication factors used to perform the authentication.

Clause 33. The method of clause 32, wherein the authentication factor is transferred to the recipient via a uniform resource locator (URL) that includes a scheme name registered to the recipient.

Clause 34. The method of clauses 32 to 33, wherein the authentication factor corresponds to a one-time password.

Clause 35. The method of clauses 32 to 34, wherein another one of the plurality of authentication factors corresponds to a user-provided password.

Clause 36. The method of clauses 32 to 35, further comprising generating, by the second application, the one-time password.

Clause 37. The method of clauses 32 to 36, further comprising receiving, by the second application, the one-time password from another computing device via a network.

Clause 38. The method of clauses 32 to 37, further comprising sending, by the first application, at least one of the plurality of authentication factors to an authentication service configured to perform the authentication.

Clause 39. The method of clauses 32 to 38, wherein the recipient corresponds to the first application.

Clause 40. The method of clauses 32 to 39, wherein the recipient corresponds to an authentication service.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a first application that, when executed in a computing device, causes the computing device to at least:
   capture an image;
   acquire a shared seed from the image;
   associate the shared seed with a second application executed by the computing device;
   generate a one-time password based at least in part on a current time and the shared seed;
   in response to receiving a request from the second application via a first local uniform resource locator (URL), generate a notification in an operating system notification window of a display of the computing device;
   facilitate entry of a user approval into the computing device via the notification by showing the operating system notification window simultaneously with a user interface window of the second application while the user interface window has focus; and
   in response to receiving the user approval, transfer the one-time password to the second application via a second local URL.

2. The non-transitory computer-readable medium of claim 1, wherein the first local URL includes a first scheme name associated with the first application, and the second local URL includes a second scheme name associated with the second application.

3. The non-transitory computer-readable medium of claim 1, wherein facilitating entry of the user approval comprises verifying a biometric factor.

4. A system, comprising:
   a data store; and
   a computing device in communication with the data store, wherein when executing a first application, the computing device is configured to at least:
      receive a one-time password from a server via a network, wherein the one-time password is generated by the server based at least in part on a current time and a shared seed and the shared seed is acquired from a captured image;
      generate a notification in an operating system notification window of a display of the computing device, the notification comprising the one-time password;
      facilitate entry of the one-time password into the computing device via the notification rendered on the display of the computing device by showing the operating system notification window simultaneously with a user interface window of a second application while the user interface window has focus; and
      in response to receiving the one-time password, transfer a security credential to the second application via a uniform resource locator (URL), wherein the second application is executed on the computing device that executes the first application.

5. The system of claim 4, wherein the computing device is further configured to at least generate the notification in response to a request from the second application.

6. The system of claim 4, wherein the computing device is further configured to at least generate the notification in response to a request from a server.

7. The system of claim 4, wherein the computing device is further configured to at least acquire a seed from an image.

8. The system of claim 4, wherein the first application receives a request via a second URL having a first scheme name associated with the first application, and the URL that the security credential is transferred via has a second scheme name associated with the second application.

9. The system of claim 4, wherein the security credential is specific to the second application.

10. The system of claim 4, wherein the second application employs a plurality of authentication factors, and the security credential corresponds to one of the plurality of authentication factors.

11. The system of claim 4, wherein the first computing device is configured to render one application user interface upon the display at a time.

12. The system of claim 4, wherein the security credential is specific to an account used by the second application.

13. The system of claim 4, wherein the computing device is further configured to at least identify the shared seed from a plurality of seeds based at least in part on the second application.

14. The system of claim 7, wherein the computing device is further configured to capture the image, wherein the seed corresponds to the shared seed.

15. A method, comprising:
   receiving, by a first application executed via a computing device, a one-time password from a server via a network, wherein the one-time password is generated by the server based at least in part on a current time and a shared seed and the shared seed is acquired from a captured image;
   receiving, by the first application executed via the computing device, a request for a security credential via a uniform resource locator (URL);
   determining, by the first application executed via the computing device, the security credential;
   causing the security credential to be rendered in a notification area window upon a display of the computing device while a user interface window of a second application executed via the computing device is also rendered upon the display while the user interface window has focus; and
   receiving, by the second application executed via the computing device, the security credential by way of a form field of the user interface window.

16. The method of claim 15, further comprising sending by the second application a request to display the security credential to the first application.

17. The method of claim 16, wherein the request to display the security credential is sent via a second URL that includes a scheme name registered to the first application.

18. The method of claim 15, wherein determining the security credential further comprises:
   identifying the shared seed from a plurality of seeds based at least in part on the second application.

19. The method of claim 15, wherein the user interface window and the notification area window fill an entirety of the display when the security credential is rendered in the notification area window.

20. The method of claim 15, wherein the notification area window comprises a notification area widget, and causing the security credential to be rendered in the notification area window comprises adding a notification component to the notification area widget.

\* \* \* \* \*